United States Patent
Bryne

(10) Patent No.: US 7,017,445 B2
(45) Date of Patent: Mar. 28, 2006

(54) PEDAL AND RELATED PEDAL/CLEAT ASSEMBLY

(75) Inventor: Richard M. Bryne, Del Mar, CA (US)

(73) Assignee: Speedplay, Inc., San Diego, CA (US)

(*) Notice: Subject to any disclaimer, the term of this patent is extended or adjusted under 35 U.S.C. 154(b) by 134 days.

(21) Appl. No.: 10/401,086

(22) Filed: Mar. 27, 2003

(65) Prior Publication Data

US 2004/0187635 A1  Sep. 30, 2004

(51) Int. Cl.
B62M 3/08 (2006.01)

(52) U.S. Cl. .................................. 74/594.6; 74/560

(58) Field of Classification Search ............ 74/478, 74/512, 560, 561, 562, 563, 564, 594.1, 594.6; 280/288.4, 294
See application file for complete search history.

(56) References Cited

U.S. PATENT DOCUMENTS

| | | | | |
|---|---|---|---|---|
| 4,298,210 A * | 11/1981 | Lotteau et al. | ............... | 280/259 |
| 4,803,894 A | 2/1989 | Howell | ............... | 74/594 |
| 4,815,333 A | 3/1989 | Sampson | ............... | 74/594.6 |
| 4,819,504 A | 4/1989 | Sampson | ............... | 74/594.4 |
| 4,827,633 A | 5/1989 | Feldstein | ............... | 36/131 |
| 4,898,063 A | 2/1990 | Sampson | ............... | 74/594.6 |
| 4,899,618 A | 2/1990 | Christol | ............... | 74/594.6 |
| 4,936,164 A | 6/1990 | Forke | ............... | 74/594.6 |
| 4,942,778 A | 7/1990 | Bryne | ............... | 74/594.6 |
| 5,199,324 A | 4/1993 | Sain | ............... | 74/594.4 |
| 5,213,009 A | 5/1993 | Bryne | ............... | 74/594.6 |
| 5,284,066 A | 2/1994 | Weiss | ............... | 74/546.6 |
| 5,325,738 A | 7/1994 | Bryne | ............... | 74/594.6 |
| 5,546,829 A | 8/1996 | Bryne | ............... | 74/594.6 |
| 5,553,516 A | 9/1996 | Weiss | ............... | 74/594.6 |
| 5,575,184 A | 11/1996 | De Schrijver | ............... | 74/594.6 |
| 5,606,894 A | 3/1997 | Bryne | ............... | 74/594.6 |
| 5,687,619 A | 11/1997 | Bryne | ............... | 74/594.6 |
| 5,852,955 A | 12/1998 | Crisick et al. | ............... | 74/594.6 |
| 5,862,716 A | 1/1999 | Bryne | ............... | 74/594.6 |
| 6,494,117 B1 * | 12/2002 | Bryne | ............... | 74/594.6 |
| 2002/0144569 A1 * | 10/2002 | Tanaka | ............... | 74/594.6 |

FOREIGN PATENT DOCUMENTS

DE  3315282 A1  10/1984
DE  3426103 A1  1/1986

(Continued)

OTHER PUBLICATIONS

Pages printed from Internet website www.bebop.com on Mar. 17, 2003.

(Continued)

*Primary Examiner*—William C Joyce
(74) *Attorney, Agent, or Firm*—Sheppard, Mullin, Richter & Hampton LLP

(57) ABSTRACT

A pedal for interfacing with a cleat. The pedal includes a plate, insert, spacer, and coupler. The plate includes a plate through hole, and is configured to interface with the cleat. The insert includes an insert through hole and a cam surface. The insert is located adjacent to the plate. The insert through hole is aligned with the plate through hole. The cam surface contacts the cleat when the plate interfaces with the cleat. The spacer includes a spacer through hole. The spacer is located adjacent to the insert, and the spacer through hole is aligned both with the plate through hole and the insert through hole. The coupler is introduced through the plate through insert through hole, and spacer through hole. The coupler couples the plate to the insert, insert to the spacer.

35 Claims, 6 Drawing Sheets

FOREIGN PATENT DOCUMENTS

| | | |
|---|---|---|
| FR | 2 279 607 | 7/1974 |
| FR | 0 012 097 | 6/1980 |
| FR | 0 015 803 | 9/1980 |
| FR | 2 518 041 | 6/1983 |
| FR | 2 609 270 | 7/1988 |

OTHER PUBLICATIONS

Pages printed from Internet website www.coombe.com on Mar. 17, 2003.

* cited by examiner

PEDAL AND RELATED PEDAL/CLEAT ASSEMBLY

FIELD OF THE INVENTION

This invention relates generally to the field of pedals, and pedal/cleat assembly, for use on bicycles. More particularly, the invention relates to a clipless pedal to which a cleat attached to the sole of a rider's shoe can be releasably secured to the pedal.

BACKGROUND OF THE INVENTION

As described in U.S. Pat. No. 6,494,117, pedal/cleat assemblies may include a disk-shaped pedal and a cleat attached to the sole of a rider's shoe for releasable securement to the pedal. The cleat may include a circular recess configured to mate with either side of the pedal. Spring-biased elements within the cleat interface with the pedal securing the cleat to the pedal. The rider can release the cleat from the pedal simply by rotating the shoe through a predetermined angle about an axis normal to the shoe's sole. This rotation urges the cleat's spring-biased elements apart from each other, eventually leading to a release of the cleat from the pedal. Many pedal/cleat assemblies of this kind provide a "float range," which is an amount of angular rotation that the rider's shoe can make without disengaging the cleat from the pedal. The float range reduces restrictions on the natural rotation of the rider's leg during pedaling, and thus, reduces the possibility of injury.

However, because the disk-shaped pedal closely interfaces with the cleat's circular recess, there is little room for dirt located between the pedal and cleat to exit the pedal/cleat assembly. Thus, dirt may build up between the pedal and cleat and interfere with the cleat mating with the pedal. Furthermore, dirt buildup in the interface between the pedal and cleat may adversely affect the mechanism used to release the cleat from the pedal. Also, the disk-shaped pedal occupies more space, and is more massive, than is needed to facilitate securement of the cleat to the pedal because the cleat's spring-biased elements only contact a portion of the pedal. Often, plastic components included in some pedal/cleat assemblies are used to secure other metal components, which may be compromised when adjacent plastic brakes and fails.

It should, therefore, be appreciated that there is a continuing need for a pedal, which occupies less space and is less massive, while still being made of robust materials. The present invention fulfills these needs.

SUMMARY OF THE INVENTION

The present invention is embodied in a pedal for interfacing with a cleat. The pedal includes a plate, insert, spacer, and coupler. The plate includes a plate through hole, and the plate is configured to interface with the cleat. The insert includes an insert through hole and a cam surface. The insert is located adjacent to the plate. The insert through hole is aligned with the plate through hole, and the cam surface contacts the cleat when the plate interfaces with the cleat. The spacer includes a spacer through hole. The spacer is located adjacent to the insert, and the spacer through hole is aligned both with the plate through hole and the insert through hole. The coupler is introduced through the plate through hole, the insert through hole, and the spacer through hole. The coupler couples the plate to the insert, and the insert to the spacer.

In more detailed features of the invention, the plate has a bow-tie shape. Also, the plate, the spacer, and the insert are made of metal. In addition, the plate includes a curved edge configured to interface with the cleat, and the spacer includes a projection that extends beyond the curved edge. Furthermore, the coupler is selected from the group including a screw and a bolt.

Another exemplary system that embodies the invention is a pedal for coupling to a spindle and for interfacing with a cleat. The pedal includes a first plate, second plate, collar, spacer, first insert, second insert, and coupler. The first plate includes a first plate through hole, and the first plate is configured to interface with the cleat. The second plate includes a second plate through hole. The second plate is coupled to the first plate and configured to interface with the cleat. The collar is located between the first plate and the second plate, and the collar is configured to couple to the spindle. The spacer includes a spacer through hole, and is located adjacent to the collar between the first plate and the second plate. The spacer through hole is aligned both with the first plate through hole and the second plate through hole. The first insert includes a first insert through hole and a first cam surface. The first insert is located adjacent to the collar between the first plate and the spacer. The first insert through hole is aligned both with the first plate through hole and the spacer through hole. The first cam surface contacts the cleat when the first plate interfaces with the cleat. The second insert includes a second insert through hole and a second cam surface, and is located adjacent to the collar between the spacer and the second plate. The second insert through hole is aligned both with the spacer through hole and the second plate through hole. The second cam surface contacts the cleat when the second plate interfaces with the cleat. The coupler is introduced through the first plate through hole, first insert through hole, spacer through hole, second insert through hole, and second plate through hole. The coupler couples the first plate to the second plate with the first insert, spacer, and second insert located between the first plate and the second plate.

In more detailed features of the invention, the first plate and the second plate each have a bow-tie shape. Also, the first plate, second plate, collar, spacer, first insert, and second insert are made of metal. In addition, the first plate includes a first curved edge configured to interface with the cleat, the second plate includes a second curved edge configured to interface with the cleat, and the spacer includes a projection that extends beyond the first curved edge and the second curved edge.

In more detailed features of the invention, the coupler is selected from the group including a screw and a bolt. Also, a first wedge-shaped piece is located between the first plate, collar, and first insert, and a second wedge-shaped piece is located between the second plate, collar, and second insert.

In more detailed features of the invention, the collar has an annular channel that interfaces with the first plate, spacer, and second plate. Also, the collar has a spindle bore that receives the spindle. An end cap inserts into one end of the spindle bore.

Another exemplary system that embodies the invention is a pedal configured to couple to a spindle and interface with a cleat. The pedal includes a first plate, second plate, collar, first spacer, second spacer, first insert, second insert, third insert, fourth insert, first coupler, and second coupler. The first plate includes a first plate through hole at one end and a second plate through hole at an opposing end. The first plate is configured to interface with the cleat. The second plate includes a third plate through hole at one end and a fourth plate through hole at an opposing end. The second plate is coupled to the first plate and configured to interface with the cleat. The collar is located between the first plate and the second plate, and is configured to couple to the spindle. The first spacer includes a first spacer through hole. The first spacer is located adjacent to the collar between the first plate and the second plate. The first spacer through hole is aligned both with the first plate through hole and the fourth plate through hole. The second spacer includes a second spacer through hole. The second spacer is located adjacent to the collar between the first plate and the second plate. The second spacer through hole is aligned both with the second plate through hole and the third plate through hole. The first insert includes a first insert through hole and a first cam surface. The first insert is located adjacent to the collar between the first plate and the first spacer. The first insert through hole is aligned both with the first plate through hole and the first spacer through hole. The first cam surface contacts the cleat when the first plate interfaces with the cleat. The second insert includes a second insert through hole and a second cam surface. The second insert is located adjacent to the collar between the second plate and the first spacer. The second insert through hole is aligned both with the fourth plate through hole and the first spacer through hole. The second cam surface contacts the cleat when the second plate interfaces with the cleat. The third insert includes a third insert through hole and a third cam surface. The third insert is located adjacent to the collar between the first plate and the second spacer. The third insert through hole is aligned both with the second plate through hole and the second spacer through hole. The third cam surface contacts the cleat when the first plate interfaces with the cleat. The fourth insert includes a fourth insert through hole and a fourth cam surface. The fourth insert is located adjacent to the collar between the second plate and the second spacer. The fourth insert through hole is aligned both with the third plate through hole and the second spacer through hole. The fourth cam surface contacts the cleat when the second plate interfaces with the cleat. The first coupler is introduced through the first plate through hole, first insert through hole, first spacer through hole, second insert through hole, and fourth plate through hole. The first coupler couples the first plate to the second plate with the first insert, first spacer, and second insert located between the first plate and the second plate. The second coupler is introduced through the second plate through hole, third insert through hole, second spacer through hole, fourth insert through hole, and third plate through hole. The second coupler couples the first plate to the second plate with the third insert, second spacer, and fourth insert located between the first plate and the second plate.

In more detailed features of the invention, the first plate and the second plate each have a bow-tie shape. Also, the first plate, second plate, collar, first spacer, second spacer, first insert, second insert, third insert, and fourth insert are made of metal. In addition, the first plate includes a first curved edge located adjacent to the first plate through hole, and a second curved edge located adjacent to the second plate through hole. The second plate includes a third curved edge located adjacent to the third plate through hole, and a fourth curved edge located adjacent to the fourth plate through hole. The first spacer includes a first projection that extends beyond both the first curved edge and the fourth curved edge. The second spacer includes a second projection that extends beyond both the second curved edge and the third curved edge.

In more detailed features of the invention, the first coupler and the second coupler are selected from the group including screws and bolts. Also, a first wedge-shaped piece is located between the first plate, collar, and first insert. A second wedge-shaped piece is located between the second plate, collar, and second insert. A third wedge-shaped piece is located between the first plate, collar, and third insert. A fourth wedge-shaped piece is located between the second plate, collar, and fourth insert.

In more detailed features of the invention, the collar includes an annular channel that interfaces with the first plate, second plate, first spacer, and second spacer. Also, the collar includes a spindle bore that receives the spindle. An end cap inserts into one end of the spindle bore.

Another exemplary system that embodies the invention is a pedal/cleat assembly. The pedal/cleat assembly includes a cleat and a pedal, having a plate, insert, spacer, and coupler. The plate includes a plate through hole, and the plate is configured to interface with the cleat. The insert includes an insert through hole and a cam surface. The insert is located adjacent to the plate. The insert through hole is aligned with the plate through hole, and the cam surface contacts the cleat when the plate interfaces with the cleat. The spacer includes a spacer through hole. The spacer is located adjacent to the insert. The spacer through hole is aligned both with the plate through hole and the insert through hole. The coupler is introduced through the plate through hole, insert through hole, and spacer through hole. The coupler couples the plate to the insert, and the insert to the spacer. The cleat is configured to be secured to a sole of a rider's shoe and is configured to interface with the pedal. The cleat includes a spring assembly that contacts the cam surface when the plate interfaces with the cleat.

In more detailed features of the invention, the plate has a bow-tie shape. Also, the plate, spacer, and insert are made of metal. In addition, the plate includes a curved edge configured to interface with the cleat, and the spacer includes a projection that extends beyond the curved edge. Furthermore, the coupler is selected from a group including a screw and a bolt.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENTS

Figure 1:
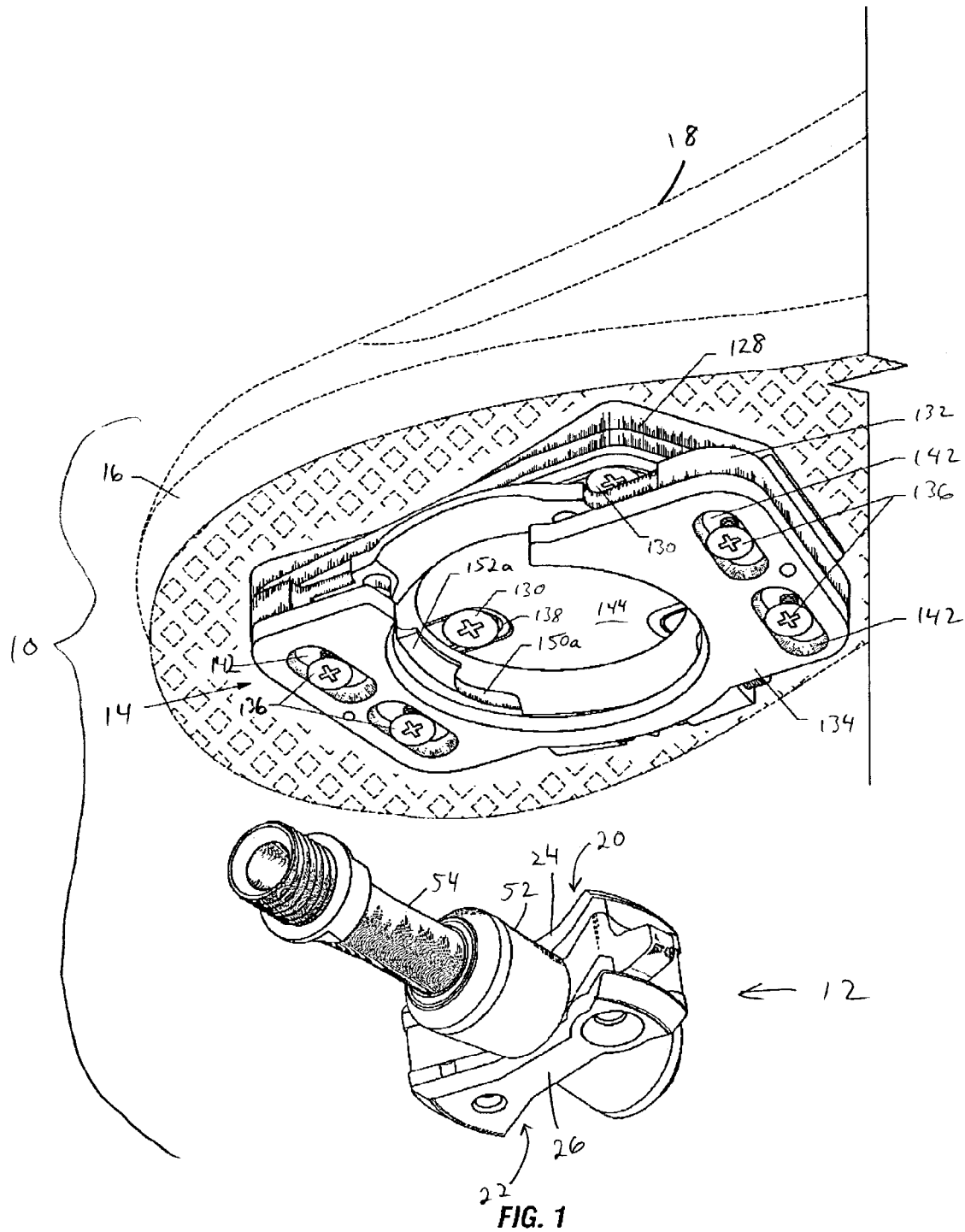
FIG. 1 is a bottom perspective view of a cleat secured to the sole of a rider's shoe, positioned above a bicycle pedal, the cleat and pedal constructed in accordance with one preferred embodiment of the invention.
Figure 2:
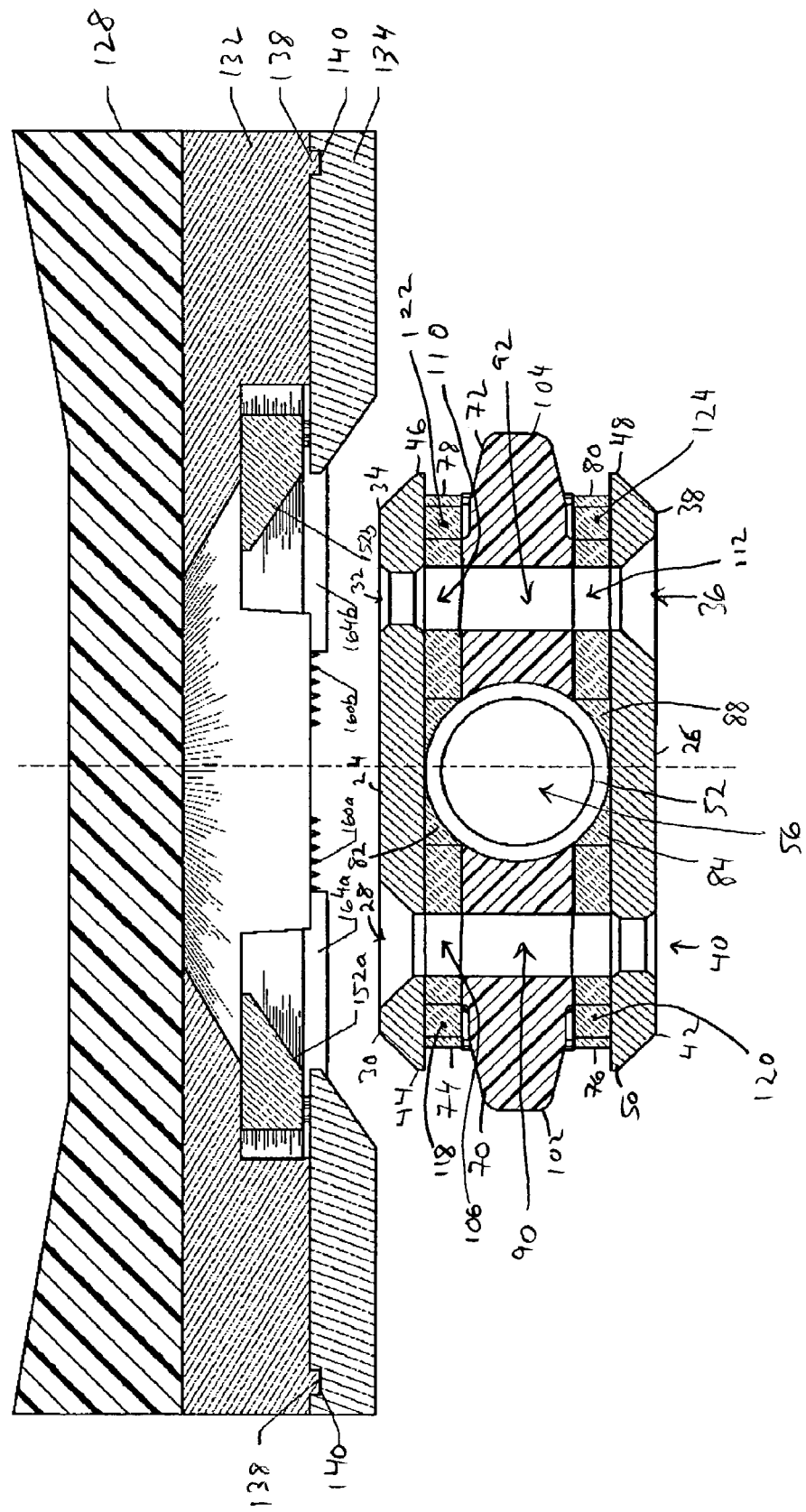
FIG. 2 is a cross-sectional view of the cleat and pedal of FIG. 1, with the cleat being shown in position above the pedal.
Figure 3:
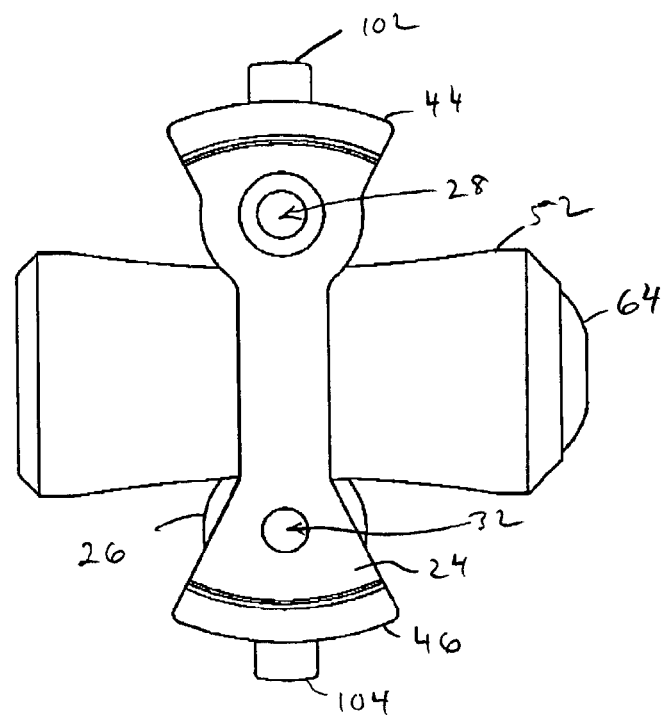
FIG. 3 is a top plan view of the pedal of FIG. 1.
Figure 4:
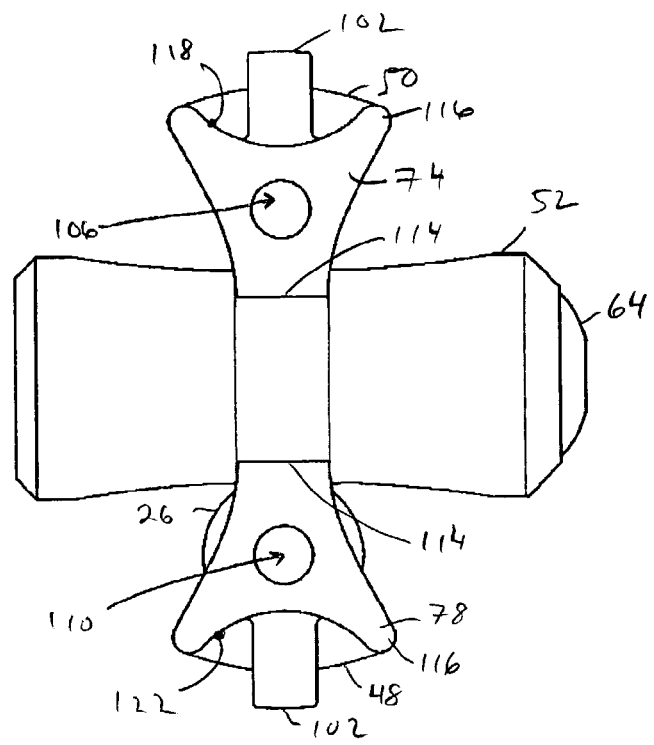
FIG. 4 is a top plan view of the pedal of FIG. 1, shown with the first plate removed.
Figure 5:
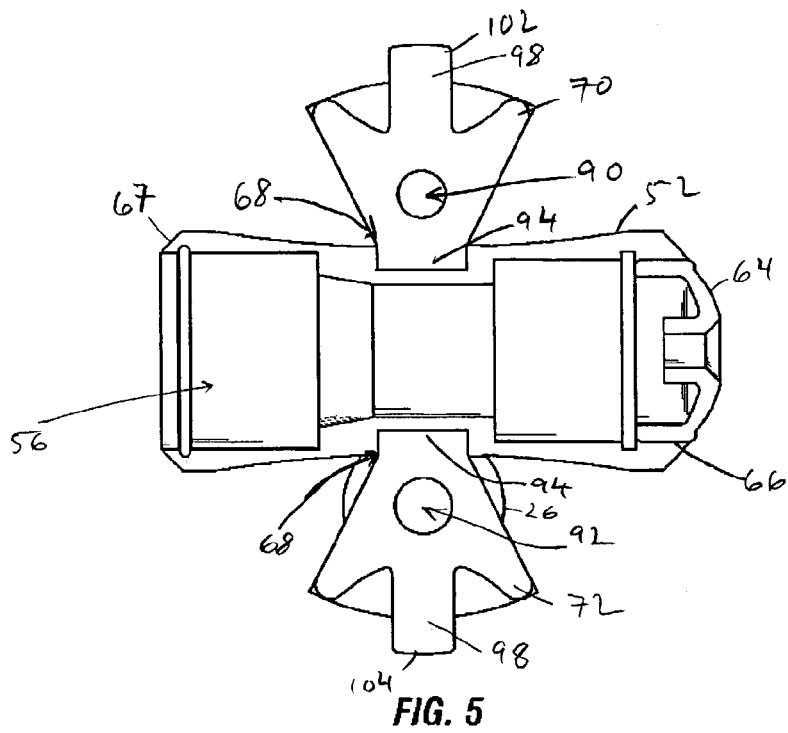
FIG. 5 is a cross-sectional view of the pedal of FIG. 1.

With reference now to the drawings, and particularly to FIGS. 1 and 2, there is shown a bicycle pedal/cleat assembly 10 that includes a pedal 12 and a cleat 14 attached to the sole 16 of a rider's shoe 18, for releasable attachment to the pedal. The pedal is symmetrical along a bisecting plane, which defines an upper side 20 and an identical lower side 22. This configuration enables the cleat to be releasably attached to either side of the pedal (upper or lower). Only a right-side pedal is shown in the drawings and discussed below, although it will be understood that a similar, mirror-image pedal can be located on the bicycle's left side.

With particular reference to FIGS. 1–5, the pedal 12 includes a first plate 24 and an identical second plate 26, both of which have, in general, a bow-tie shape. The first and second plates are configured in a spaced-apart and parallel configuration. The first and second plates are each configured to insert into the cleat 14 when the pedal interfaces with the cleat. The upper plate includes a first through hole 28 at one end 30 and a second through hole 32 at an opposing end 34. Similarly, the second plate includes a third through hole 36 at one end 38 and a fourth through hole 40 at an opposing end 42.

Curved edges 44–50, configured to interface with the cleat 14 when each plate 24 and 26 is inserted into the cleat, are located at each of the opposing ends 30, 34, 38, and 42 of both the first and second plates. Accordingly, a first curved edge 44 is located at one end 30 of the first plate 24 adjacent to the first through hole 28, and a second curved edge 46 is located at the opposing end 34 of the first plate adjacent to the second through hole 32. A third curved edge 48 is located at one end 38 of the second plate 26 adjacent to the third through hole 36, and a fourth curved edge 50 is located at the opposing end 42 of the second plate adjacent to the fourth through hole 40.

The pedal 12 also includes a cylindrical collar 52, having a generally cylindrical shape, located between the first and second plates 24 and 26, respectively. The collar is configured to couple to a spindle 54, which is inserted into a spindle bore 56 formed through the collar. A disk-shaped end cap 64 is inserted into one end 66 of the collar. The collar also includes an annular channel 68 located approximately equidistant from the collar's two ends 66 and 67. The first and second plates 24 and 26, respectively, as well as the below-described spacers 70 and 72, inserts 74–80, and wedge-shaped pieces 82–88 interface with the annular channel.

As indicated above, the pedal 12 also includes a first spacer 70 and a second spacer 72, both of which are located between the first and second plates 24 and 26, respectively, with the collar 52 located between the two spacers. Each spacer includes a through hole 90 and 92, respectively. One end 94 of each spacer is located adjacent to the collar and is positioned securely in the annular channel 68. The other end 98 of each spacer includes a projection 102 and 104, respectively, which extends beyond the curved edges 44–50 of the first and second plate. Thus, the first spacer has a first projection 102, which extends beyond the first and fourth edges 44 and 50, respectively. Also, the second spacer has a second projection 104, which extends beyond the second and third edges 46 and 48, respectively.

In addition, the pedal 12 includes four A-shaped inserts 74–80. Each of the four inserts has a through hole 106–112 and is located between either the first or second plates 24 or 26, respectively, and one of the spacers 70 and 72. Specifically, a first insert 74 is located between the first plate 24 and the first spacer 70, a second insert 76 is located between the first spacer and the second plate 26, a third spacer 78 is located between the first plate and the second spacer 72, and a fourth spacer 80 is located between the second spacer and the second plate. The first, second, third, and fourth inserts each have one end 114 that is located adjacent to the collar 52 and positioned securely in the annular channel 68, and an opposing end 116 that includes a first, second, third, and fourth cam surface, 118, 120, 122, and 124, respectively. As will be described in greater detail below, these cam surfaces are configured to engage a spring assembly 126 included in the cleat 14, and facilitate a convenient release of the cleat from the pedal.

The pedal 12 also includes four wedge-shaped pieces 82–88, each of which are located between one of the first and second plates 24 and 26, respectively, the collar 52, and one of the inserts 74–80. Accordingly, a first wedge-shaped piece 82 is located between the first plate 24, collar 52, and first insert 74, a second wedge-shaped piece 84 is located between the second plate 26, collar, and second insert 76, a third wedge-shaped piece 86 is located between the first plate, collar, and third insert 78, and a fourth wedge-shaped piece 88 is located between the second plate, collar, and fourth insert 80. In alternative embodiments, the pedal does not include separate wedge-shaped pieces, rather, the structure of the wedge-shaped pieces is incorporated into either the first and second plates, into an adjacent insert, or into the collar.

A pair of couplers (not shown), e.g., screws or bolts, couple the first plate 24 to the second plate 26 with the first and second spacers 70 and 72, and first, second, third, and fourth inserts 74–80 located in between the first and second plates as depicted in FIG. 2. In particular, a first coupler inserts through the aligned through holes 106, 108, and 90, respectively, of the first and second inserts 74 and 76, respectively, and the first spacer 70, and the first and fourth through holes 28 and 40, respectively. Similarly, a second coupler inserts through the aligned through holes 110, 112, and 92, respectively, of the third and fourth inserts 78 and 80, respectively, and the second spacer 72, and the second and third through holes 32 and 36, respectively. If the first and second couplers are screws (not shown), they are inserted through the first and third through holes, respectively, which are countersunk to receive the head (not shown) of each screw, and interface with the fourth and second through holes, each of which are threaded. In other embodiments, the first and second couplers may be bolts (not shown), in which case, the second and fourth through holes need not be threaded. Rather, the bolts are secured by nuts (not shown) located adjacent to the second and fourth through holes. The pedal 12 including the first and second plates, collar 52, spacers, inserts, wedge-shaped pieces 82–88, and couplers are formed of suitable high-strength metals.

With particular reference now to FIGS. 1, 2, and 6–10, the cleat 14 includes an upper plate 128, secured by screws 130 to the sole 16 of the rider's shoe 18, a lower plate 132, and a cover plate 134 secured by screws 136 to the upper plate. The screws for attaching the upper plate to the shoe sole extend through three oblong holes 138 (one shown) formed in the upper plate, which are oriented longitudinally relative to the sole's longitudinal axis. This allows for a precise longitudinal adjustment of the location of the upper plate on the sole. The lower late and the cover plate incorporate interlocking tabs 138 and corresponding recesses 140. The screws for attaching these two plates to the upper plate extend through four oblong holes 142 that are oriented laterally relative to the sole's longitudinal axis. The screws are received in threaded inserts (not shown) embedded within the upper plate. This allows for a precise lateral adjustment of the lower plate and cover plate relative to the upper plate.

Central portions of the cleat's lower plate 132 and interlocked cover plate 134 define a circular seat 144 sized to receive the first or second plate 24 and 26, respectively, of the pedal 12. Encircling this seat is a spring clip 126, or spring assembly, having an arcuate shape that follows the circular seat's periphery. A gap 146 is defined in the spring clip on the inboard side of the cleat 14, i.e., the side of the cleat facing the spindle 54, such that the spring clip further defines forward and rearward arcuate arms 148a and 148b. The radially inward sides 150a and 150b of these arms carry tongues 152a and 152b, respectively, which are sized and positioned to engage the respective cam surfaces 118–124 located adjacent to the pedal's first or second plate, and to releasably secure the cleat to the pedal.

Figure 6:
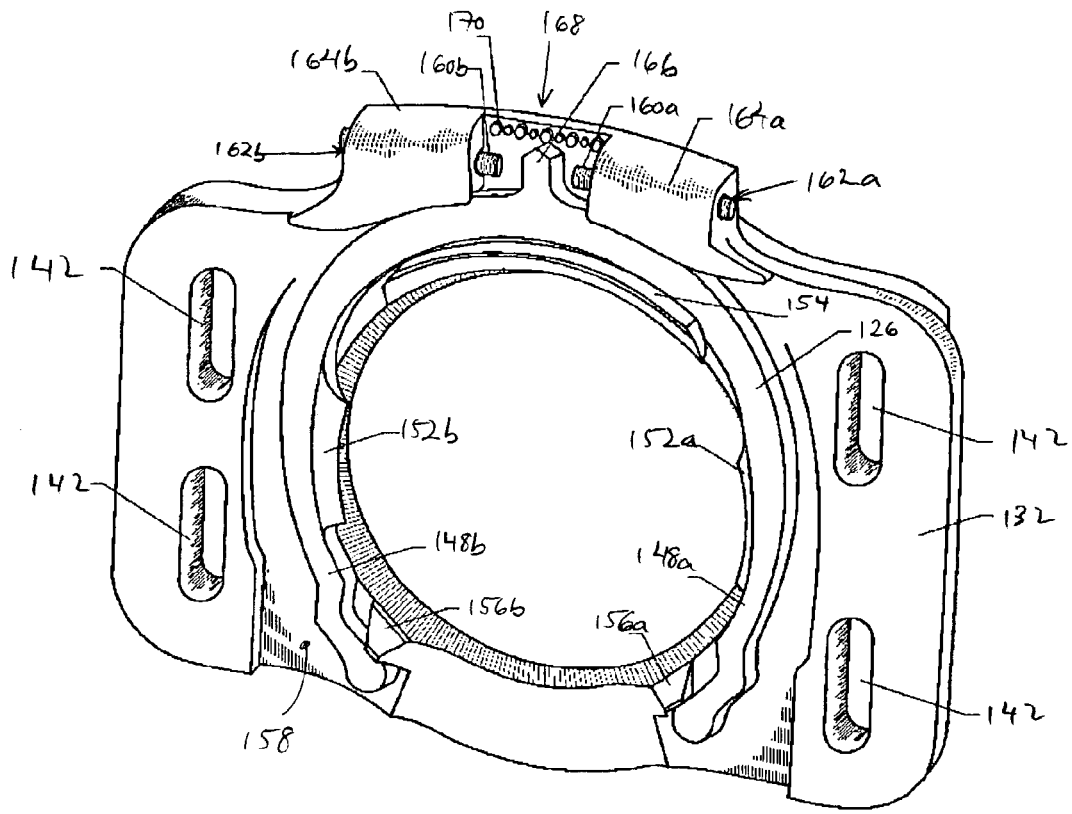
FIG. 6 is a bottom perspective view of the cleat of FIG. 1.
Figure 7:
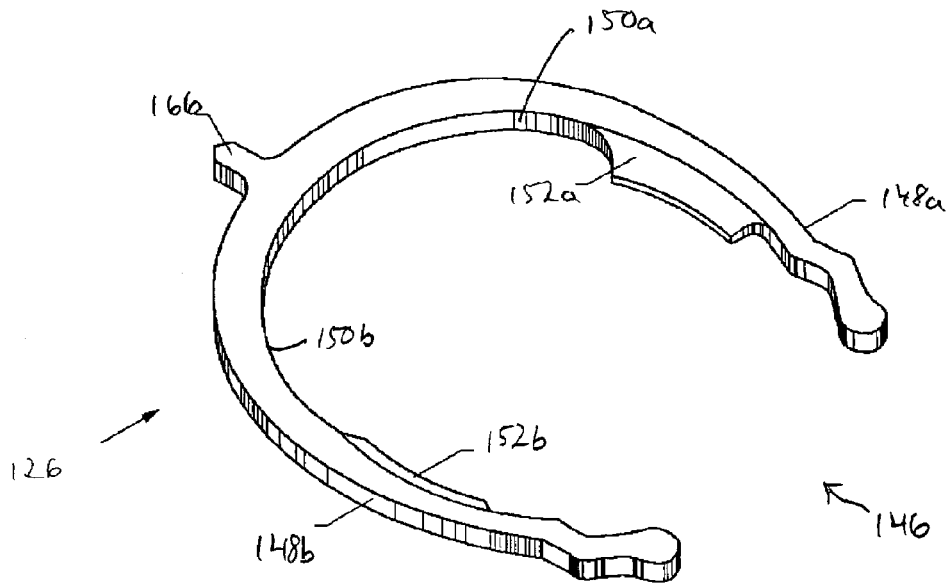
FIG. 7 is a perspective view of the spring clip portion of the cleat of FIG. 6.
Figure 8:
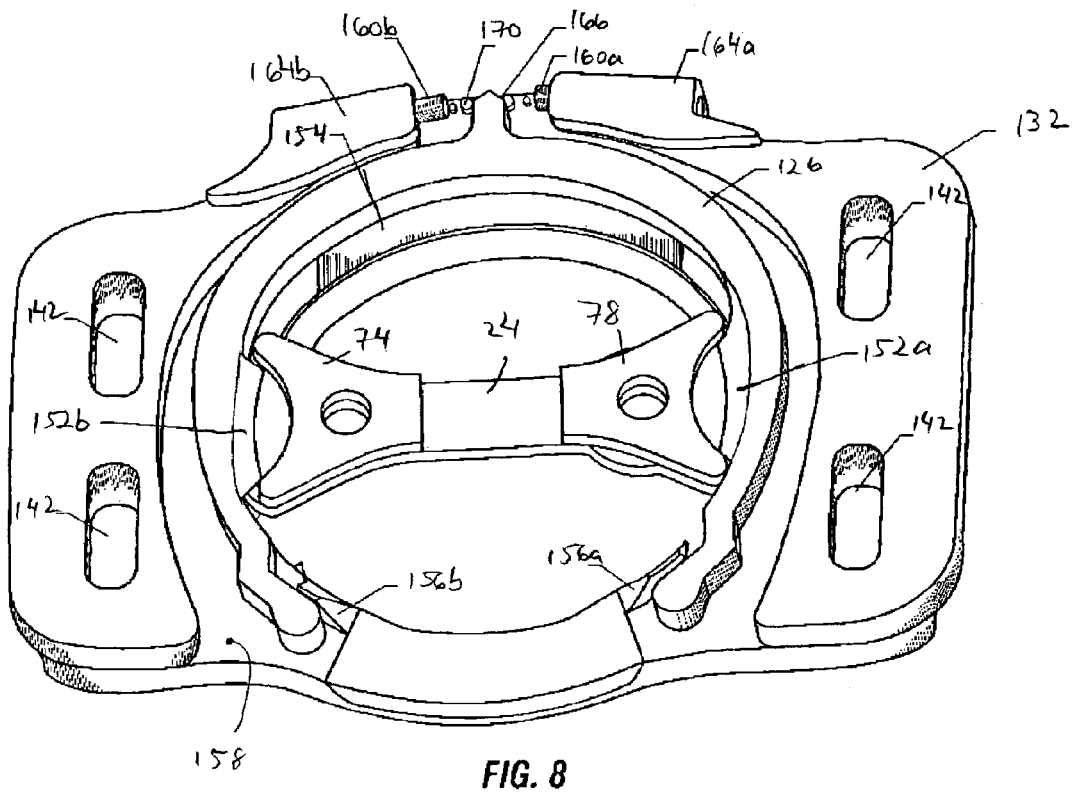
FIG. 8 is a bottom perspective view of the cleat of FIG. 6, shown with two inserts and the first plate of the pedal in their positions locked to the cleat, with the cleat is in its nominal, centered position on the pedal, with the finger of the cleat's spring clip located midway between the cleat's forward and rearward set screw stops.
Figure 9:
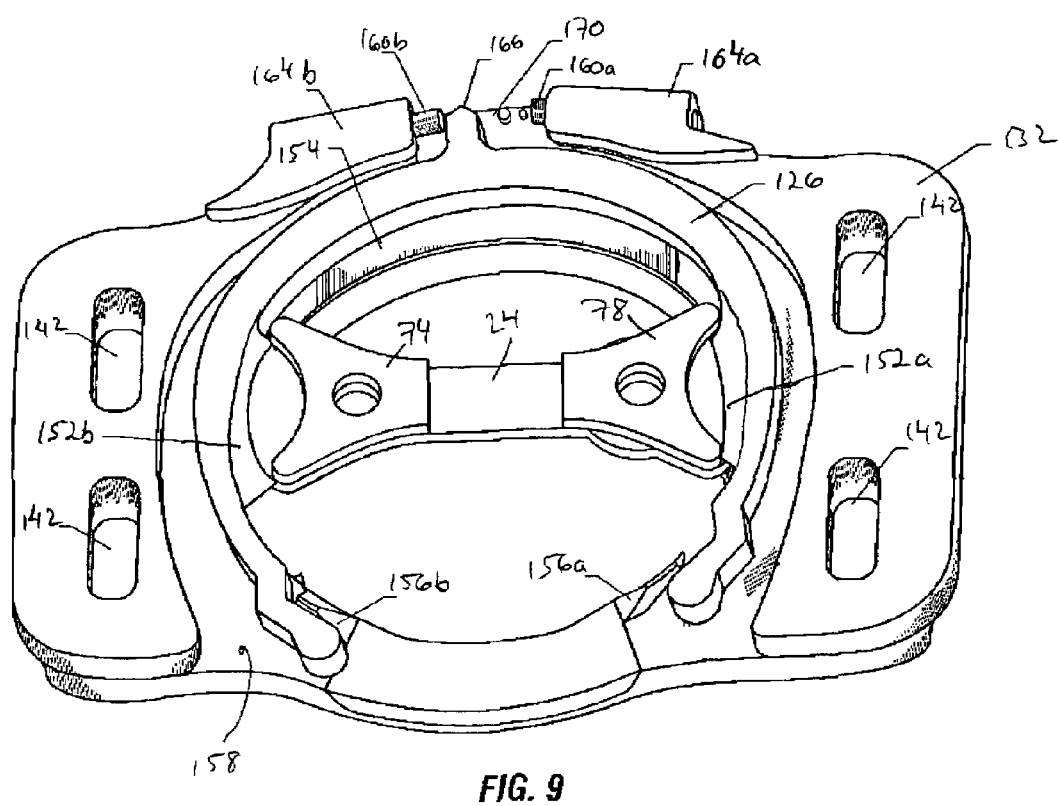
FIG. 9 is a bottom perspective view similar to FIG. 8, but with the cleat rotated to a position where the finger of the cleat's spring clip first engages a cleat set screw stop.
Figure 10:
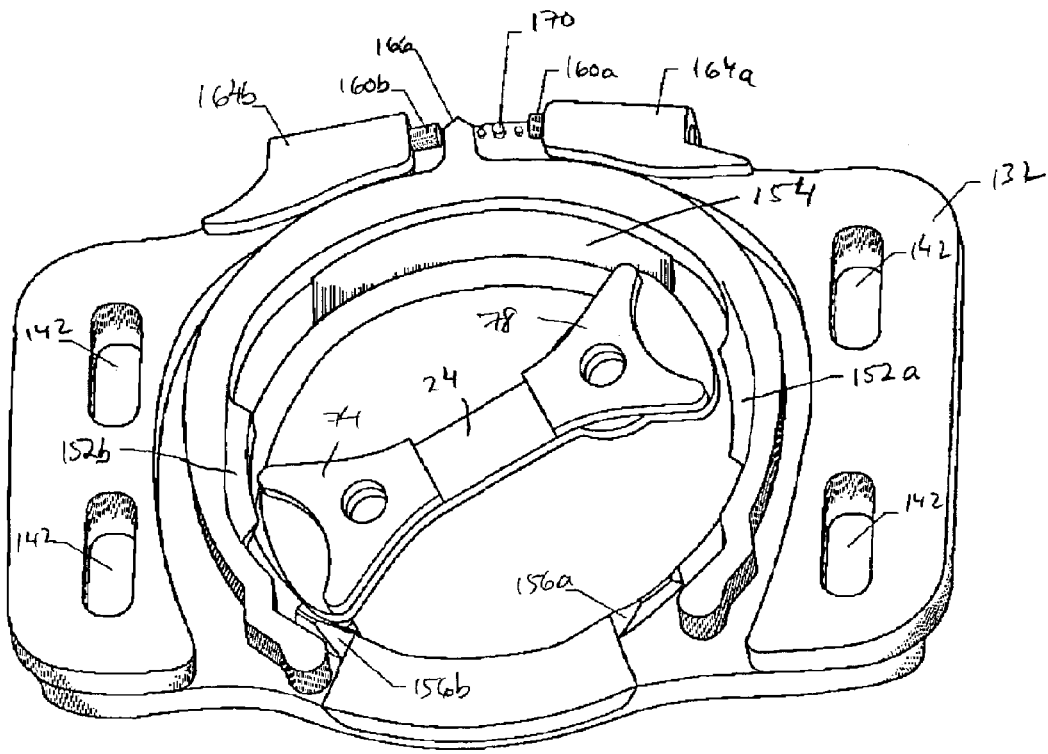
FIG. 10 is a bottom perspective view similar to FIG. 9, but with the cleat rotated to a position where the tongues of the cleat's spring clip release their grip on the two inserts.

The spring clip 126 is held in the position depicted in FIG. 6 by its own spring tension, urging it inwardly against an upstanding arcuate wall 154 and forward and rearward stops 156a and 156b, respectively, located immediately adjacent to the circular seat 144. The forward and rearward stops also function to position the spring clip's forward and rearward arcuate arms 148a and 148b, respectively, and their tongues 152a and 152b, respectively, in their prescribed positions to engage and retain the pedal 12. The radially inward-facing sides of the upstanding wall and of the stops are beveled, to facilitate alignment of the cleat 14 with the pedal when the cleat is being secured to the pedal. The cover plate 134 holds the spring clip against the lower plate's lower surface 158, to prevent it from falling off during use.

The radially inward-facing sides of the tongues 152a and 152b are beveled, to match corresponding bevels at the opposing ends 30, 34, 38, and 42 of the pedal's first and second plates 24–26. This facilitates alignment of the cleat 14 with the pedal 12 when the cleat is being secured to the pedal. Specifically, forcing the cleat downwardly causes one or both of the bevels at the opposing ends of either the first or second plate to urge the corresponding arms 148a and 148b of the spring clip 126 to flex radially outward to accommodate the pedal.

in operation, the rider secures the cleat 14 onto the pedal 12 by centering the cleat's circular seat 144 over the pedal and orienting the cleat so that one of the tongues 152a and 152b of the cleat's spring clip 126 contacts the bevels at the opposing ends 30, 34, 38, and 42 of the pedal's first or second plates 24 and 26, respectively. The rider then forces the cleat downwardly against the pedal, causing one of the two tongues to flex radially outward until the cleat is secured in place with the tongues contacting two of the cam surfaces 118 and 122 or 120 and 124. After the cleat has been secured in this fashion, the rider can apply a driving force to the pedal throughout the entire pedal cycle.

Disengagement of the cleat 14 from the pedal 12 can be accomplished by rotating the cleat in either a heel-in or a heel-out direction about an axis normal to the plane of the sole 16 of the rider's shoe 18. Such rotation causes the cam surfaces 118 and 122 or 120 and 124 to forcibly engage the adjacent tongues 152a and 152b. Eventually, the tongues and thus their arms 148a and 148b, respectively, are urged radially outward sufficiently to disengage the cam surfaces and expand beyond the curved edges 44–50 of the first or second plates 24 and 26, respectively, and thereby release the cleat from the pedal.

The angles of the cam surfaces 118–124 affect the amount of torque that the rider must apply to the cleat 14 to disengage the cleat from the pedal 12. The angles of the cam surfaces at the opposite ends 30, 34, 38, and 42 of pedal need not match each other. In addition, the angles of each tongue 152a and 152b need not match the angles of the mating cam surfaces.

In accordance with the invention, a desired amount of angular float is provided between the cleat 14 and the pedal 12 before the arms 148a and 148b of the cleat's spring clip 126 are urged radially outward a sufficient distance to release the cleat from the pedal. This is accomplished by configuring the spring clip to remain rotationally fixed relative to the pedal, while the lower plate 132 is rotated in either a heel-in or a heel-out direction relative to the spring clip and the pedal. After the cleat plate has rotated through a selected angle, however, rotation of the lower plate relative to the spring clip is prevented. Further rotation of the cleat plate causes the spring clip arms to be flexed outwardly, releasing the cleat.

The amount of pedal float is controllably adjusted using forward and rearward set screws 160a and 160b, respectively, that are carried within threaded bores 162a and 162b, respectively, formed in upstanding walls 164a and 164b, respectively. These upstanding walls are located radially outward of a mid-portion of the spring clip 126, on the portion of the cleat 14 intended to be disposed away from the spindle side of the pedal 12. An integral finger 166 projects radially outward from the mid-portion of the spring clip, into a space 168 defined between the upstanding walls. While the spring clip is rotationally fixed relative to the pedal due to the contact between the spring clip and the cam surfaces 118 and 122 or 120 and 124, rotation of the lower plate 132 thus causes one of the two set screws to move toward the finger and the other set screw to move away from the finger. Eventually, continued rotation of the lower plate brings one of the set screws into contact with the finger, after which point, the spring clip rotates with the lower plate.

The space 168 defined between the upstanding walls 164a and 164b is sized to allow a float of up to about 7.5° in either rotational direction. A maximum float is provided by retracting the set screws 160a and 160b fully into their respective upstanding walls. On the other hand, a minimum float (i.e., zero float) is provided by extending the set screws fully into the space between the walls. Of course, any amount of float between zero float and the maximum float can be selected simply by adjustably positioning the set screws.

The position of the forward set screw 160a controls the amount of float provided in the heel-in direction, and the position of the rearward set screw 160b controls the amount of float provided in the heel-out direction. Suitable reference markings 170 are provided to indicate the amount of float that has been selected. It further will be appreciated that the heel-in float and the heel-out float can be adjusted independently of each other. It will further be appreciated that the structure described above provides only minimal resistance to rotational movement of the lower plate 132 relative to the pedal 12, within the float range.

It should be appreciated from the foregoing description that the present invention provides a pedal/cleat assembly 10 having a pedal 12 and a cleat 14 configured to conformably mate together and a float range that is easily and precisely adjusted. The cleat's spring clip 126 is configured for limited rotation relative to the cleat's lower plate 132 on which it is mounted, about a rotation axis generally normal to the sole of the rider's shoe 18 when the pedal and the cleat are mated together. When the spring clip is engaged with the pedal's cam surfaces 118 and 122 or 120 and 124, rotation of the cleat relative to the pedal causes the spring clip to rotate relative to the lower plate, until a stop 156a or 156b inhibits further relative rotation. Continued rotation of the cleat relative to the pedal urges the spring assembly out of engagement with the cam surfaces, and releases the cleat from the pedal.

Also, it should be appreciated from the foregoing description that the pedal 12 advantageously occupies less space than a typical disk-shaped pedal, and thus, results in a pedal having a reduced-mass. Also, the pedal is robust because all of the pedal's components are made entirely of metal. Furthermore, each of the pedal's metal components are easily and inexpensively formed by turning or stamping individual pieces of metal.

Also, the pedal's cam surfaces 118–124 are advantageously included as integral components on the inserts 74–80, which are securely fastened to the other parts of the pedal 12 using a screw or bolt (not shown) that inserts through the insert's through hole 106–112. In prior art pedals, analogous cam surfaces may be included on metal pieces that insert into plastic components. By including the cam surfaces on the metal inserts, the present invention eliminates the need for any surrounding plastic. Thus, the pedal according to the present invention can be made smaller than prior art pedals.

In addition, it should be appreciated that the pedal/cleat assembly 10 offers space for dirt and mud to exit the interface between the pedal 12 and the cleat 14 because the pedal is not disk-shaped. Therefore, dirt, which may inhibit mating of the pedal and the cleat, or interfere with the movement of the cleat's spring clip 126, need not remain between the pedal and the cleat.

It will be appreciated that the invention has been described in detail with reference only to the presently preferred embodiment. Various modifications can be made without departing from the invention. Accordingly, the invention is defined only by the following claims.

I claim:

1. A pedal for coupling to a spindle and for interfacing with a cleat, the pedal comprising:
   a first plate including a first plate through hole, wherein the first plate is configured to interface with the cleat;
   a second plate including a second plate through hole, wherein the second plate is coupled to the first plate and configured to interface with the cleat;
   a collar located between the first plate and the second plate, wherein the collar is configured to couple to the spindle;
   a spacer including a spacer through hole, wherein the spacer is located adjacent to the collar between the first plate and the second plate, and the spacer through hole is aligned both with the first plate through hole and the second plate through hole;
   a first insert including a first insert through hole and a first cam surface, wherein the first insert is located adjacent to the collar between the first plate and the spacer, the first insert through hole is aligned both with the first plate through hole and the spacer through hole, and the first cam surface contacts the cleat when the first plate interfaces with the cleat;
   a second insert including a second insert through hole and a second cam surface, wherein the second insert is located adjacent to the collar between the spacer and the second plate, the second insert through hole is aligned both with the spacer through hole and the second plate through hole, and the second cam surface contacts the cleat when the second plate interfaces with the cleat; and
   a coupler introduced through the first plate through hole, the first insert through hole, the spacer through hole, the second insert through hole, and the second plate through hole, wherein the coupler couples the first plate to the second plate with the first insert, the spacer, and the second insert located between the first plate and the second plate.

2. The pedal according to claim 1, wherein the first plate and the second plate each have a bow-tie shape.

3. The pedal according to claim 1, wherein the first plate, the second plate, the collar, the spacer, the first insert, and the second insert are made of metal.

4. The pedal according to claim 1, wherein:
   the first plate includes a first curved edge configured to interface with the cleat;
   the second plate includes a second curved edge configured to interface with the cleat; and
   the spacer includes a projection extending beyond the first curved edge and the second curved edge.

5. The pedal according to claim 1, wherein the coupler is selected from the group comprising a screw and a bolt.

6. The pedal according to claim 1, further comprising:
   a first wedge-shaped piece located between the first plate, the collar, and the first insert; and
   a second wedge-shaped piece located between the second plate, the collar, and the second insert.

7. The pedal according to claim 1, wherein the collar has an annular channel that interfaces with the first plate, the spacer, and the second plate.

8. The pedal according to claim 1, wherein the collar has a spindle bore that receives the spindle.

9. The pedal according to claim 1, further comprising an end cap that inserts into one end of the spindle bore.

10. A pedal configured to couple to a spindle and interface with a cleat, the pedal comprising:
   a first plate including a first plate through hole at one end and a second plate through hole at an opposing end, wherein the first plate is configured to interface with the cleat;
   a second plate including a third plate through hole at one end and a fourth plate through hole at an opposing end, wherein the second plate is coupled to the first plate and configured to interface with the cleat;
   a collar located between the first plate and the second plate, wherein the collar is configured to couple to the spindle;
   a first spacer including a first spacer through hole, wherein the first spacer is located adjacent to the collar between the first plate and the second plate, and the first spacer through hole is aligned both with the first plate through hole and the fourth plate through hole;
   a second spacer including a second spacer through hole, wherein the second spacer is located adjacent to the collar between the first plate and the second plate, and the second spacer through hole is aligned both with the second plate through hole and the third plate through hole;

a first insert including a first insert through hole and a first cam surface, wherein the first insert is located adjacent to the collar between the first plate and the first spacer, the first insert through hole is aligned both with the first plate through hole and the first spacer through hole, and the first cam surface contacts the cleat when the first plate interfaces with the cleat;

a second insert including a second insert through hole and a second cam surface, wherein the second insert is located adjacent to the collar between the second plate and the first spacer, the second insert through hole is aligned both with the fourth plate through hole and the first spacer through hole, and the second cam surface contacts the cleat when the second plate interfaces with the cleat;

a third insert including a third insert through hole and a third cam surface, wherein the third insert is located adjacent to the collar between the first plate and the second spacer, the third insert through hole is aligned both with the second plate through hole and the second spacer through hole, and the third cam surface contacts the cleat when the first plate interfaces with the cleat;

a fourth insert including a fourth insert through hole and a fourth cam surface, wherein the fourth insert is located adjacent to the collar between the second plate and the second spacer, the fourth insert through hole is aligned both with the third plate through hole and the second spacer through hole, and the fourth cam surface contacts the cleat when the second plate interfaces with the cleat;

a first coupler introduced through the first plate through hole, the first insert through hole, the first spacer through hole, the second insert through hole, and the fourth plate through hole, wherein the first coupler couples the first plate to the second plate with the first insert, the first spacer, and the second insert located between the first plate and the second plate; and a second coupler introduced through the second plate through hole, the third insert through hole, the second spacer through hole, the fourth insert through hole, and the third plate through hole, wherein the second coupler couples the first plate to the second plate with the third insert, the second spacer, and the fourth insert located between the first plate and the second plate.

11. The pedal according to claim 10, wherein the first plate and the second plate each have a bow-tie shape.

12. The pedal according to claim 10, wherein the first plate, the second plate, the collar, the first spacer, the second spacer, the first insert, the second insert, the third insert, and the fourth insert are made of metal.

13. The pedal according to claim 10, wherein:
the first plate includes:
  a first curved edge located adjacent to the first plate through hole, and
  a second curved edge located adjacent to the second plate through hole;
the second plate includes:
  a third curved edge located adjacent to the third plate through hole, and
  a fourth curved edge located adjacent to the fourth plate through hole;
the first spacer includes a first projection extending beyond both the first curved edge and the fourth curved edge; and the second spacer includes a second projection extending beyond both the second curved edge and the third curved edge.

14. The pedal according to claim 10, wherein the first coupler and the second coupler are selected from the group comprising screws and bolts.

15. The pedal according to claim 10, further comprising:
a first wedge-shaped piece located between the first plate, the collar, and the first insert;
a second wedge-shaped piece located between the second plate, the collar, and the second insert;
a third wedge-shaped piece located between the first plate, the collar, and the third insert; and
a fourth wedge-shaped piece located between the second plate, the collar, and the fourth insert.

16. The pedal according to claim 10, wherein the collar includes an annular channel that interfaces with the first plate, the second plate, the first spacer, and the second spacer.

17. The pedal according to claim 10, wherein the collar includes a spindle bore that receives the spindle.

18. The pedal according to claim 17, further comprising an end cap that inserts into one end of the spindle bore.

19. A pedal for coupling to a spindle and for interfacing with a cleat, the pedal comprising:
a first plate including a first plate through hole, wherein the first plate is configured to interface with the cleat;
a second plate including a second plate through hole, wherein the second plate is coupled to the first plate and configured to interface with the cleat;
a collar located between the first plate and the second plate, wherein the collar is configured to couple to the spindle;
a spacer including a spacer through hole, wherein the spacer is located adjacent to the collar between the first plate and the second plate, and the spacer through hole is aligned both with the first plate through hole and the second plate through hole;
a first insert including a first insert through hole and a first cam surface, wherein the first insert is located adjacent to the collar between the first plate and the spacer, the first insert through hole is aligned both with the first plate through hole and the spacer through hole, and the first cam surface contacts the cleat when the first plate interfaces with the cleat;
a second insert including a second insert through hole and a second cam surface, wherein the second insert is located adjacent to the collar between the spacer and the second plate, the second insert through hole is aligned both with the spacer through hole and the second plate through hole, and the second cam surface contacts the cleat when the second plate interfaces with the cleat; and
a coupler introduced through the first plate through hole, the first insert through hole, the spacer through hole, the second insert through hole, and the second plate through hole, wherein the coupler couples the first plate to the second plate with the first insert, the spacer, and the second insert located between the first plate and the second plate;
wherein the collar has an annular channel that interfaces with the first plate, the spacer, and the second plate.

20. The pedal according to claim 19, wherein the first plate and the second plate each have a bow-tie shape.

21. The pedal according to claim 19, wherein the first plate, the second plate, the collar, the spacer, the first insert, and the second insert are made of metal.

22. The pedal according to claim 19, wherein:
the first plate includes a first curved edge configured to interface with the cleat;
the second plate includes a second curved edge configured to interface with the cleat; and
the spacer includes a projection extending beyond the first curved edge and the second curved edge.

23. The pedal according to claim 19, wherein the coupler is selected from the group consisting of a screw and a bolt.

24. The pedal according to claim 19, further comprising:
a first wedge-shaped piece located between the first plate, the collar, and the first insert; and
a second wedge-shaped piece located between the second plate, the collar, and the second insert.

25. The pedal according to claim 19, wherein the collar has a spindle bore that receives the spindle.

26. The pedal according to claim 25, further comprising an end cap that inserts into one end of the spindle bore.

27. A pedal configured to couple to a spindle and interface with a cleat, the pedal comprising:
a first plate including a first plate through hole at one end and a second plate through hole at an opposing end, wherein the first plate is configured to interface with the cleat;
a second plate including a third plate through hole at one end and a fourth plate through hole at an opposing end, wherein the second plate is coupled to the first plate and configured to interface with the cleat;
a collar located between the first plate and the second plate, wherein the collar is configured to couple to the spindle;
a first spacer including a first spacer through hole, wherein the first spacer is located adjacent to the collar between the first plate and the second plate, and the first spacer through hole is aligned both with the first plate through hole and the fourth plate through hole;
a second spacer including a second spacer through hole, wherein the second spacer is located adjacent to the collar between the first plate and the second plate, and the second spacer through hole is aligned both with the second plate through hole and the third plate through hole;
a first insert including a first insert through hole and a first cam surface, wherein the first insert is located adjacent to the collar between the first plate and the first spacer, the first insert through hole is aligned both with the first plate through hole and the first spacer through hole, and the first cam surface contacts the cleat when the first plate interfaces with the cleat;
a second insert including a second insert through hole and a second cam surface, wherein the second insert is located adjacent to the collar between the first plate and the second spacer, the second insert through hole is aligned both with the second plate through hole and the second spacer through hole, and the second cam surface contacts the cleat when the first plate interfaces with the cleat;
a first coupler introduced through the first plate through hole, the first insert through hole, the first spacer through hole, and the fourth plate through hole, wherein the first coupler couples the first plate to the second plate with the first insert, and the first spacer located between the first plate and the second plate; and
a second coupler introduced through the second plate through hole, the second insert through hole, the second spacer through hole, and the third plate through hole, wherein the second coupler couples the first plate to the second plate with the second insert, and the second spacer located between the first plate and the second plate.

28. The pedal according to claim 27, wherein the first plate and the second plate each have a bow-tie shape.

29. The pedal according to claim 27, wherein the first plate, the second plate, the collar, the first spacer, the second spacer, the first insert, and the second insert are made of metal.

30. The pedal according to claim 27, wherein:
the first plate includes:
a first curved edge located adjacent to the first plate through hole, and
a second curved edge located adjacent to the second plate through hole;
the second plate includes:
a third curved edge located adjacent to the third plate through hole, and
a fourth curved edge located adjacent to the fourth plate through hole;
the first spacer includes a first projection extending beyond both the first curved edge and the fourth curved edge; and
the second spacer includes a second projection extending beyond both the second curved edge and the third curved edge.

31. The pedal according to claim 27, wherein the first coupler and the second coupler are selected from the group consisting of screws and bolts.

32. The pedal according to claim 27, further comprising:
a first wedge-shaped piece located between the first plate, the collar, and the first insert; and
a second wedge-shaped piece located between the first plate, the collar, and the second insert.

33. The pedal according to claim 27, wherein the collar includes an annular channel that interfaces with the first plate, the second plate, the first spacer, and the second spacer.

34. The pedal according to claim 27, wherein the collar includes a spindle bore that receives the spindle.

35. The pedal according to claim 34, further comprising an end cap that inserts into one end of the spindle bore.

* * * * *

UNITED STATES PATENT AND TRADEMARK OFFICE
CERTIFICATE OF CORRECTION

PATENT NO. : 7,017,445 B2  
APPLICATION NO. : 10/401086  
DATED : March 28, 2006  
INVENTOR(S) : Richard M. Bryne It is certified that error appears in the above-identified patent and that said Letters Patent is hereby corrected as shown below:

TITLE PG, (57) In the Abstract, LN 12, before "insert," please insert -- hole, --.

TITLE PG, ITEM (57) In the Abstract, LN 13, after "insert" (first occurrence), please insert -- and the --.

At column 4, line 46, before "DESCRIPTION" please insert -- BRIEF --.

At column 7, line 7, "late" should be --plate --.

Signed and Sealed this

Fifteenth Day of August, 2006

JON W. DUDAS  
*Director of the United States Patent and Trademark Office*